United States Patent [19]

Lohberg

[11] 4,417,632

[45] Nov. 29, 1983

[54] AUTOMATIC WEIGHING METHOD AND DEVICE

[75] Inventor: Peter Lohberg, Friedrichsdorf, Fed. Rep. of Germany

[73] Assignee: Battelle Institut e.V., Frankfurt am Main, Fed. Rep. of Germany

[21] Appl. No.: 285,086

[22] PCT Filed: Nov. 14, 1980

[86] PCT No.: PCT/EP80/00132

§ 371 Date: Jul. 13, 1981

§ 102(e) Date: Jul. 13, 1981

[87] PCT Pub. No.: WO81/01463

PCT Pub. Date: May 28, 1981

[30] Foreign Application Priority Data

Nov. 14, 1979 [DE] Fed. Rep. of Germany ....... 2945940

[51] Int. Cl.$^3$ .......................... G01G 7/00; G01G 1/26
[52] U.S. Cl. ...................................... 177/212; 177/248
[58] Field of Search ................... 177/204, 212, 248, 25

[56] References Cited

U.S. PATENT DOCUMENTS 4,004,458 1/1977 Knothe et al. .
4,149,605 4/1979 Mettler et al. ........................ 177/173
4,153,124 5/1979 Knothe et al. .................. 177/248 X

FOREIGN PATENT DOCUMENTS 1004822 3/1957 Fed. Rep. of Germany .
1294056 4/1969 Fed. Rep. of Germany .
2511103 6/1976 Fed. Rep. of Germany .
2621483 7/1977 Fed. Rep. of Germany .
2803978 3/1979 Fed. Rep. of Germany ...... 177/212
2388258 2/1978 France .

Primary Examiner—George H. Miller, Jr.
Attorney, Agent, or Firm—Fisher, Christen & Sabol

[57] ABSTRACT

For the automatic weighing of a beam balance with electromagnetic force compensation, substitution control weights and digital recording are used. An indicator signals the position of balance beam to a microcomputer. The load compensation is carried out with a limited number of variable electromagnetic compensation forces of constant amplitude, which are produced by means of a corresponding number of discrete constant currents. The currents are graded according to decreasing powers of a numerical system of a suitable basis; as a rule, just like decimally organized figures according to units and powers of ten of these units. Starting out from upper to lower decades, a count is made in each decade as to how many compensation units are needed in order to overcompensate the load. For this purpose, a decision is made merely in the case of every compensation step—without determining precisely the rest position of the balance beam—as to whether the load applied is larger or smaller than the compensation force. Whenever the indicator signals an overcompensation, then the preceding counting step is regarded as the weighing result of this decade. Numerical correction values are assigned to each compensation step of each decade. The weighing results develops from the sum of the weighing results of all decades and the sum of correction values which had been assigned to the evaluated compensation steps of each decade.

11 Claims, 1 Drawing Figure

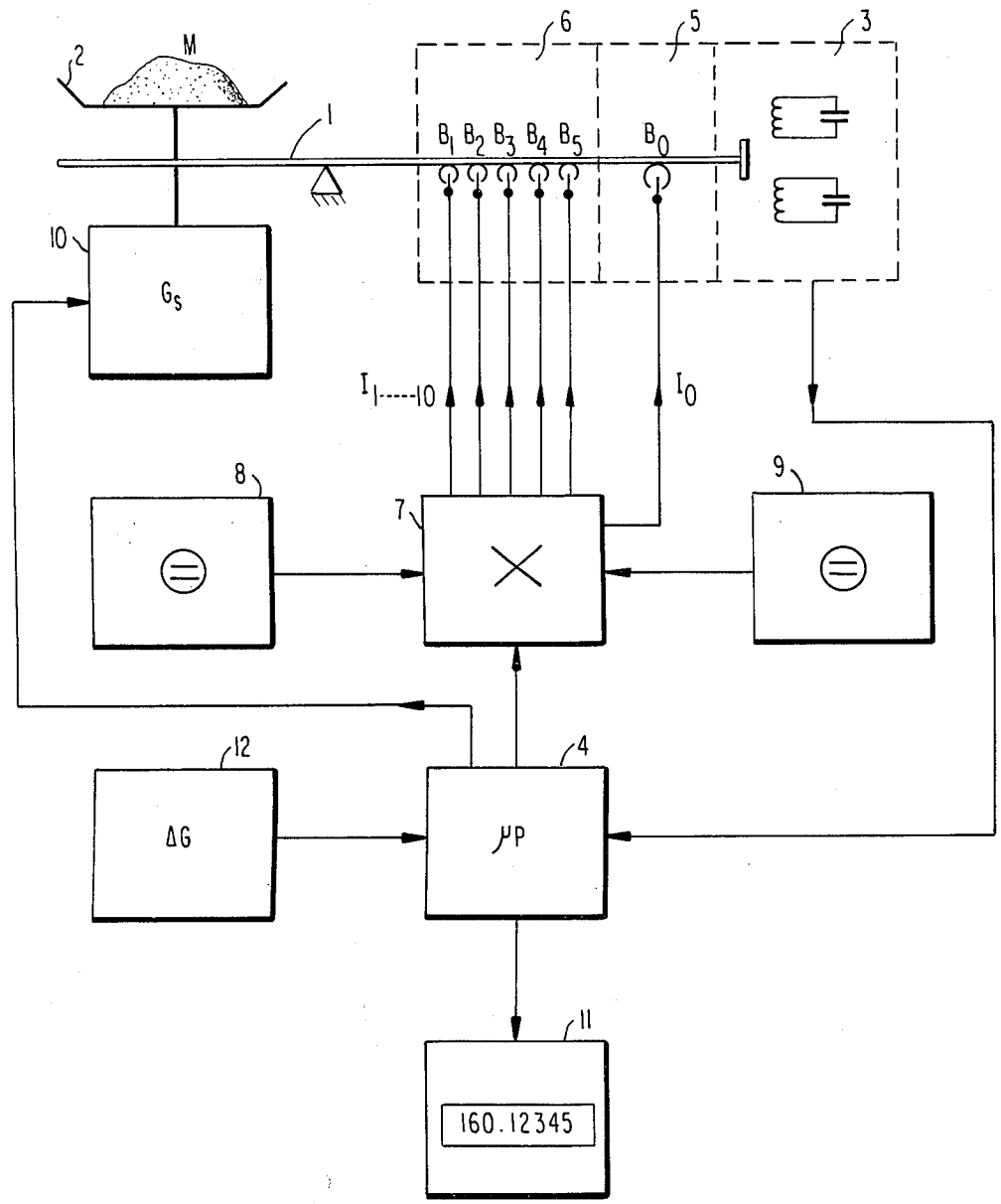

AUTOMATIC WEIGHING METHOD AND DEVICE

BACKGROUND OF THIS INVENTION

1. Field of this Invention

This invention relates to a process for automatic weighing, whereby the deflection of the balance beam is compensated within the scope of a regulating process electromagnetically and/or by other methods, for example, by substitution weights, and the compensation force needed for this is used as a measure for the mass to be determined. The apparatus of this invention for executing this process is built up according to the principle of the electromagnetic force compensation, possibly in connection with other compensating systems (for example, substitution control weights) and with the use of a microprocessor as well as of an arrangement for signaling the deflection of the balance beam from the rest position, and it has a digital recording.

2. Prior Art

Electronic balances have been known, for example a sensor, attached to the balance beam in the manner of a closed control loop, which signal the non-existence of the rest position to an electromagnetic force compensation system. A current of sufficient strength is produced in dependence on this deflection in order to compensate for the distortion of the balance beam. At the same time, the sensor is returned automatically into the zero position. The current needed in order to bring about the zero position is measured and is used as a measure for the weight to be determined (for example, *Gast,* Feinwerktechnik 53, 167–172, 1949). More recent developments provide microprocessors which are able to store and process the measuring values obtained from the control loop. At the same time, the microprocessor merely serves for the evaluation of the measurement results and has no function within the control loop.

Furthermore, substitution balances are known where a weight compensation is accomplished by lifting off of control weights.

The force compensation systems of conventional balances must operate with a precision which corresponds to the entire weighing range to be resolved. In the case of analytical balances, for example, the error must not amount to more than fractions of one per mil. Temperature differences and other possible disturbing values must be compensated over the same range by physical measures. Thus, for example, control weights of 100 g must be made precisely to $10^{-5}$, as a result of which the production process becomes more expensive. In the case of such systems, furthermore, the zero indicator must be capable of indicating the exact rest position of the balance beam since any deviation will cause a more or less severe measuring error.

BROAD DESCRIPTION OF THIS INVENTION

This invention is based on the object of providing a process and a device with which (while avoiding the disadvantages of the above mentioned methods and devices) disturbing factors—for example, temperature influences—may be precisely compensated in a simple manner. Furthermore, merely the deflection of the balance beam is to be signaled and not its precise rest position.

It has turned out that this object may be solved with a process of the initially described kind whenever compensating forces are used which are graded according to decreasing powers of a numerical system of an appropriate basis, whereby the weight value of each power is always compensated by $(n-1)$ quantization steps, whereby n signifies the number of quantization steps within the numerical system used which causes an overcompensation, and in that the weight is determined from the sum of the compensation forces of all powers. The weighing result is determined by adding the sum of the compensation forces of all powers and from the sum of the electronically stored correction values according to numbers, whereby the correction values correspond to the compensation errors which were determined for each compensation step once within the scope of a calibrating process. Advantageously the compensation forces are scaled decadically. Also advantageously the correction values are taken into account both in case of electromagnetic force compensation as well as in case of compensation by other methods, for example, by substitution weights.

The device for carrying out this process, that is, the arrangement for signalling the deflection of the balance beam from the rest position, is connected with a microprocessor which controls a current distribution network, which in connection with a precision current source produces currents of quantized strengths which feed at least one electromagnetic force compensation arrangement. Preferably, one separate force compensation arrangement is provided for every power. However, it is also conceivable to combine several force compensation arrangements. Furthermore, there is an electronic storage connected with the microprocessor in which correction values may be called up, whereby the correction values correspond to the compensation errors which were determined once for each compensation step within the scope of one calibrating process.

The weight compensation of this invention may be accomplished electromagnetically exclusively or by other methods—for example, by substitution weights. However, the weight compensation may also be accomplished partly by electronic means, according to the substitution principle.

In the case of this invention, the otherwise customary continuous control process, up to the return of the balance beam, is changed over into a limited number of discrete steps—for example, whenever the compensation steps are sealed by decades, 10 steps per decade. The fact that a weight correction value may be assigned to each of these steps constitutes a special advantage. It is therefore sufficient to produce a substitution control weight of 100 g precisely only to $10^{-2}$ and to determine the remaining error by a single exact weighing. This remaining error, as a numerical correction value, is stored electronically as belonging to the pertinent weight. The same applies also for electromagnetic force compensation systems, which are assigned to individual decades. The precision requirements for these production systems are thereby reduced to the percentual range. The weighing result consequently develops from the addition of the sum of the weight compensation values—precise, for example, up to $10^{-2}$—of all decades and tbhe sum of the stored correction values assigned to the participating compensation steps. This invention reduces the hitherto customary manufacturing expenditure therefore practically to a precise calibrating weighing, i.e., determination of the correction values. The arrangement for signaling the deflection of the balance beam does not have to indicate the precise rest position. Generally, a binary decision is sufficient as to whether the weight is too large or too small. In the special case, whenever the exact residual weight is already compensated by the $n^{th}$ step, (i.e., no definite binary decision takes place), the weight is found to be too large in the $(n+1)^{th}$ step, and nevertheless reduces it by the algorithm to $(n-1)$, i.e., the exact value.

Another advantage of this invention is that disturbance factors, especially temperature influences, may be compensated precisely by using variable correction tables which are dependent on the magnitude of the disturbing parameter. The behavior of the balance may be non-linear to any extent. The weight might be determined precisely by introduction of corresponding correction tables. The electronic storage capacity for this, at about 80 locations per correction list, for example, is very small according to the present state of microcomputer technology.

DETAILED DESCRIPTION OF THIS INVENTION

The process and this device of the invention is described in more detail on the basis of the drawing which shows one embodiment. At the same time, the description applies to a balance which permits the resolution of a measuring range of 160 g to 10 μg. The force compensation is accomplished partly according to the substitution principle, partly electromagnetically.

On the left-hand side of the balance beam 1 there is a loading pan 2 with the mass M to be weighed. An indicating arrangement 3 signals the deflection from the rest position to a microprocessor 4, i.e., an applied load. The right-hand side of the balance beam is provided additionally with electromagnetic force compensation arrangements 5, 6, which may be developed for example, as plunger or rotating coil systems. The force compensation arrangements 5 and 6 are fed from a current distribution network 7. The current distribution is controlled by the microprocessor 4. The distribution network 7 obtains current from a precision current source 8 of high time constancy and from a second current source 9 of higher power, of which low requirements of constancy are made. In principle, however, this second current source 9 could also be dropped. Additional control outputs are connected with a substitution weight circuit 10, as well as the weight indicator 11. In addition, the device has an arrangement 12 for the electronic storage of current or weight correction values.

The weighing processes are repeated cyclically. A weighing takes place as follows:

The arrangement 3 signals to the microprocessor 4 that a load has been put on. The microprocessor 4 produces a current $I_o$ rising in 160 equal steps by way of the distributor network 7 and the current source 9, which feeds the force compensation arrangement 6. The compensation force develops proportionally to the product of current strength and magnetic induction, so that in the case of constant induction $B_o$, the current strength $I_o$ represents a measure for the compensating weight. The compensation arrangement 5 is designed such that one current step $I_o$ corresponds to a weight of 1 g ± 1%.

Whenever the reversal of the arrangement 3 is signaled to the microprocessor 4, then the latter causes the weight circuit 10 to lift the substitution weights $G_s$ corresponding to $(n-1)$ g, whenever n was the number of the steps $I_o$, which dissolved the indicator reversal. Thus, the mass M is determined in its gram range. The microprocessor 4 now produces decadically staggered currents $I_1$ to $I_{10}$ by means of the precision current source 8 via the current distributor network 7, which might produce with the induction $B_1$ compensation forces in the range of $10^{-1}$ g, with $B_2$ compensation forces in the range of $10^{-2}$ g, etc. Each decade, beginning with the first digit after the decimal point, is tested in steps of 1/10 by increasing the current ($I_1$ to $I_2$ to $I_3$ etc.) to the effect as to whether the indicator signals a reversal. Whenever that is the case after n steps, then this decade is compensated by a holding current corresponding to $(n-1)$ steps and subsequently the next decade is examined.

The values of all decades obtained thus are added by the microprocessor 4 after a correction value, stored in the storage 12 and pertaining to each value, has been taken into consideration. Work with correction values decreases the requirement for the technical balancing of the force compensations to the percentual range. However, the tolerances must be developed such that one decade is reached safely or is easily exceeded. The microprocessor 4 then produces the indication of the weight and starts a new weighing cycle whenever the load put on changes. During this new weighing process always the last indication remains unchanged.

By way of summary, for automatic weighing of a beam balance with electromagnetic force compensation, substitution control weights and digital recording are used. An indicator signals the position of balance beam to a microcomputer. The load compensation is carried out with a limited number of variable electromagnetic compensation forces of constant amplitude, which are produced by means of a corresponding number of discrete constant currents. The currents are graded according to decreasing powers of numerical system of a suitable basis; as a rule, just like decimally organized figures according to units and powers of ten of these units. Starting out from upper to lower decades, a count is made in each decade as to how many compensation units are needed in order to overcompensate the load. For this purpose, a decision is made merely in the case of every compensation step—without determining precisely the rest position of the balance beam—as to whether the load applied is larger or smaller than the compensation force. Whenever the indicator signals an overcompensation, then the preceding counting step is regarded as the weighing result of this decade. Numerical correction values are assigned to each compensation step of each decade. The weighing result develops from the sum of the weighing results of all decades and the sum of correction values which had been assigned to the evaluated compensation steps of each decade.

What is claimed is:

1. Process for the automatic weighing, in case of which the deviation of the balance beam from the rest position is compensated within the scope of a regulating process electromagnetically and the compensation force needed for this is used as a measure for the mass to be determined, characterized in that compensating forces are used which are graded according to decreasing power of a decadal numerical system, whereby, starting out from larger to smaller compensation force the weight-value of each power is always compensated by $(n-1)$ quantization steps, whereby n signifies that number of quantization steps within the used decadal system which causes an overcompensation, in that the weight is determined from the sum of the compensation forces of all powers, and in that the weighing result is determined from the addition of the sum of the compensation forces of all powers and the sum of numerically and electronically stored correction values, whereby the correction values correspond to the compensation errors which were determined once within the scope of one calibrating process for each compensation step.

2. Process as claimed in claim 1, characterized in that the weighing result is determined from the addition of the sum of the compensation forces of all powers and the sum of numerically and electronically stored correction values, whereby the correction values correspond to the compensation errors which were determined once within the scope of one calibrating process for each compensation step.

3. Process as claimed in claim 1 or 2, characterized in that the compensation forces are scaled decadically.

4. Process as claimed in claim 3, characterized in that the correction values are taken into account both in the case of electromagnetic force compensation as well as in case of compensation by other methods, for example, by substitution weights.

5. Device for carrying out the process claimed in claim 3 with digital recording, built up according to the principle of electromagnetic force compensation, possibly in connection with other compensation systems, for example, substitution weights, and with the use of a microprocessor as well as of an arrangement for signaling the deflection of the balance beam from its rest position, characterized in that the arrangement for signaling the deflection of the balance beam from the rest position is connected with the microprocessor, which controls a current distribution network, which in connection with a precision current source produces currents of quantized strengths, which feed at least one electromagnetic force compensation arrangement.

6. Device as claimed in claim 5, characterized in that a separate force compensation arrangement ($B_1$, $B_2$, $B_3$ ...) is provided for each power.

7. Device as in claim 5, characterized in that an electronic storage is provided in connection with the microprocessor, in which correction values may be stored, capable of being called up, whereby the correction values correspond to the compensation errors which were determined once within the scope of a calibrating process for every compensation step.

8. Device as claimed in claim 5, characterized in that one force compensation arrangement is provided for several powers.

9. Device as in claim 8, characterized in that an electronic storage is provided in connection with the microprocessor in which correction values may be stored, capable of being called up, whereby the correction values correspond to the compensation errors which were determined once within the scope of a calibrating process for every compensation step.

10. Process for the automatic weighing, in case of which the deviation of the balance beam from the rest position is compensated within the scope of a regulating process by substitution weights, and the compensation force needed for this is used as a measure for the mass to be determined, characterized in that compensating forces are used which are graded according to decreasing powers of a decadal numerical system, whereby, starting out from larger to smaller compensation forces the weight-value of each power is always compensated by $(n-1)$ quantization steps, whereby n signifies that number of quantization steps within the used decadal system which causes an over-compensation, in that the weight is determined from the sum of the compensation forces of all powers, and in that the weighing result is determined from the addition of the sum of the compensation forces of all powers and the sum of numerically and electronically stored correction values, whereby the correction values correspond to the compensation errors which were determined once within the scope of one calibrating process for each compensation step.

11. Device for carrying out the process of claim 10, with digital recording, built up according to a compensation system which utilizes substitution weights, and with the use of a microprocessor as well as of an arrangement for signaling the deflection of the balance beam from its rest position, characterized in that the arrangement for signaling the deflection of the balance beam from the rest position is connected with the microprocessor, which controls a current distribution network, which in connection with a precision current source produces currents of quantized strengths, which feed at least one electromagnetic force compensation arrangement.

* * * * *